US006256686B1

(12) United States Patent
Cornwell

(10) Patent No.: US 6,256,686 B1
(45) Date of Patent: Jul. 3, 2001

(54) BI-DIRECTIONAL SERIAL VIDEO PORT

(75) Inventor: Randy D. Cornwell, Beaverton, OR (US)

(73) Assignee: Grass Valley (US) Inc., Nevada City, CA (US)

( * ) Notice: Subject to any disclaimer, the term of this patent is extended or adjusted under 35 U.S.C. 154(b) by 0 days.

(21) Appl. No.: 09/063,952

(22) Filed: Apr. 21, 1998

(51) Int. Cl.$^{7}$ .................................................... G06F 3/14

(52) U.S. Cl. ............................................ 710/62; 710/72

(58) Field of Search ...................... 710/62–74, 126–131; 326/37, 62; 708/322, 506

(56) References Cited

U.S. PATENT DOCUMENTS

| | | | | |
|---|---|---|---|---|
| 4,349,870 | | 9/1982 | Shaw et al. | 364/200 |
| 4,402,067 | | 8/1983 | Moss et al. | 365/219 |
| 4,582,170 | * | 4/1986 | Horiuchi | 184/6.12 |
| 4,677,467 | | 6/1987 | Hayes | 358/86 |
| 4,703,198 | | 10/1987 | Porter et al. | 307/473 |
| 5,043,606 | | 8/1991 | Lewis | 307/475 |
| 5,428,800 | | 6/1995 | Hsieh et al. | 395/775 |
| 5,602,494 | | 2/1997 | Sundstrom | 326/39 |
| 5,604,450 | | 2/1997 | Borkar et al. | 326/82 |
| 5,666,491 | * | 9/1997 | Harris, Jr. et al. | 710/62 |
| 5,687,387 | * | 11/1997 | Endejan et al. | 710/2 |
| 5,781,927 | * | 7/1998 | Wu et al. | 711/151 |
| 5,910,909 | * | 6/1999 | Purcell et al. | 708/322 |
| 5,929,928 | * | 7/1999 | Matsugami et al. | 348/563 |
| 5,949,473 | * | 9/1999 | Goodman | 348/14 |
| 5,959,678 | * | 9/1999 | Callahan et al. | 348/442 |

FOREIGN PATENT DOCUMENTS

| | | | | |
|---|---|---|---|---|
| 0952515A2 | * | of 0000 | (EP) | G06F/3/14 |
| 2173077A | * | of 0000 | (GB) | H04H/1/04 |

OTHER PUBLICATIONS

"Sandar AD–2000 Digital Audio Routing Switchers", Sandar Electronics a/s P. Box 2004, N–3202 Sandefjord, Norway.

* cited by examiner

*Primary Examiner*—Christopher B. Shin
(74) *Attorney, Agent, or Firm*—Kenyon & Kenyon

(57) ABSTRACT

A bi-directional serial video port coupled to a cable has a cable driver coupled to a cable connector via a D.C. blocking capacitor and a cable impedance matching resistor in series. A receiver is coupled to the cable connector via a decoupling capacitor. When configured as an input port, a control signal causes the output from the cable driver to be low so that the cable impedance matching resistor forms a termination for a cable connected to the cable connector and the receiver passes at serial digital video signal from the cable connector for further processing. Otherwise a serial digital video signal is passed by the cable driver to the cable and the output from the receiver is disregarded.

5 Claims, 1 Drawing Sheet

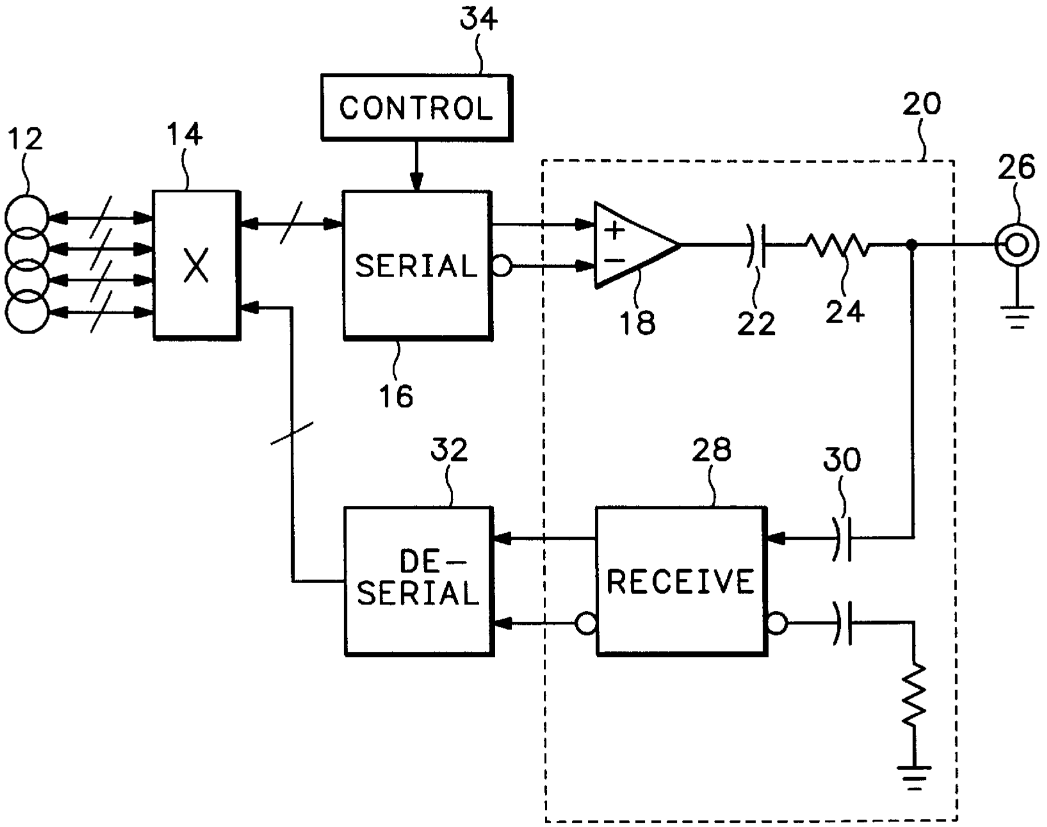
34
CONTROL
20
12
14
26
X
SERIAL
+
−
18
22
24
16
32
28
30
DE-
SERIAL
RECEIVE

BI-DIRECTIONAL SERIAL VIDEO PORT

CROSS-REFERENCE TO RELATED APPLICATIONS

Not applicable.

STATEMENT REGARDING FEDERALLY FUNDED RESEARCH OR DEVELOPMENT

Not applicable.

BACKGROUND OF THE INVENTION

The present invention relates to the transmission of serial video signals, and more particularly to a bi-directional serial video port for coupling a serial digital video signal to/from a cable, such as a coaxial cable.

Typically digital video hardware, such as the Profile Professional Digital Recorder (PDR) manufactured by Tektronix, Inc. of Beaverton, Oreg., has dedicated ports for the input and output of serial digital video signals to/from the hardware. In the Profile PDR, for example, an input/output board may have four ports—two for input and two for output. In order to have a specified number of outputs, such as six, three such boards are required even though only two inputs may be required—a total of twelve ports where only eight are required. Alternatively several different boards may have to be designed, such as boards with all output ports or combinations thereof, rather than one standard one to provide the required configuration for the hardware. Also if one of the ports becomes unusable due to some sort of failure, it is not possible to add another port of the same type without replacing the board upon which the failed port resides, which could result in unacceptable down time for the hardware.

What is desired is a bi-directional serial video port for coupling a serial digital video signal to/from a cable that may be configured as either an input port or an output port depending upon hardware requirements.

BRIEF SUMMARY OF THE INVENTION

Accordingly the present invention provides a bi-directional serial video port for coupling a serial digital video signal to/from a cable, such as a coaxial cable, that is configurable as either an input port or an output port. A digital video signal from a digital video source is serialized, if in parallel form, and input to a cable driver as a complementary serial digital video signal pair. At the output of the cable driver is a D.C. blocking capacitor, to remove any D.C. component from the serial digital video signal, and an impedance matching resistor in series with a port connector, such as a coaxial BNC connector. The port connector is also coupled via a decoupling capacitor to an equalization receiver. The equalization receiver is always active for receiving serial digital video signals, but the resulting output may be disabled when the port is configured as an output port. Alternatively when the port is configured as an input port, the output from the cable driver is disabled "low", the impedance matching resistor serves as a cable termination, and the output from the receiver is enabled.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is a block diagram view of a bi-directional serial video port according to the present invention.

DETAILED DESCRIPTION OF THE INVENTION

Referring now to the FIGURE, in one implementation a parallel digital video signal from a video source 12, such as the disc drives of a video disc recorder, is routed via a cross-point switch or router 14 to a serializer 16 to convert the parallel digital video signal into a serial digital video signal. Other circuitry may be inserted between the router 14 and the serializer 16, as necessary, to format or pre-process the parallel digital video signal. The output from the serializer 16 is a complementary serial digital video signal pair that is input to a cable driver 18 which is part of a bi-directional serial video port 20. The serial digital video signal from the cable driver 18 is applied via a series D.C. blocking capacitor 22 and an impedance matching resistor 24 to a cable connector 26, such as a coaxial BNC connector.

The bi-directional serial video port 20 also includes a receiver 28 coupled to the cable connector 26 via a decoupling capacitor 30. Since the input to the receiver 28 is a high impedance load, the impedance matching resistor 24 serves as a cable termination load for a cable connected to the cable connector 26. The receiver 28 provides equalization and amplification to a received signal that is matched to the characteristics of the cable connected to the cable connector 26. A complementary received serial digital video signal pair is output from the receiver 28 and input to a deserializer 32 to convert the serial digital video signal into a parallel digital video signal. The parallel digital video signal is input to the router 14 for input to the video source 12 if the port 20 is configured as an input port.

In operation in this implementation a control signal is applied from a controller 34 to the serializer 16. If the desired configuration for the bi-directional serial video port 20 is as an output port, the parallel digital video signal from the router 14 is processed by the serializer 16 to provide the complementary serial digital video signals for input to the cable driver 18. The output from the deserializer 32 is terminated at the router 14, and so any received signal is inhibited from further processing. If the desired configuration is as an input port, the control signal causes the serializer 16 to inhibit the input from the router 14 and provides a low level output, essentially providing the impedance matching resistor 24 as a termination for the cable connected to the cable connector 26. The router 14 is configured to pass the output from the deserializer 32 for further processing, such as storage on the video source 12.

Thus the present invention provides a bi-directional serial video port for coupling a serial digital video signal to a cable, the port being configurable as either an input port or an output port depending upon a control signal which disables a cable driver to provide a cable termination to the cable in the form of an impedance matching resistor between the cable driver and the cable connector when configured as an input port, and which passes the serial digital video signal to the cable and disables a receiver when configured as an output port.

What is claimed is:

1. A bi-directional serial video port comprising:

a cable connector for coupling the port to a cable;

a cable driver having a serial digital video signal as an input and having an output;

a cable impedance matching resistor coupled in series between the output of the cable driver and the cable connector;

a receiver having an input coupled to the cable connector and having an output; and means for configuring the port as an input port by driving the output of the cable driver low so that the cable impedance matching resistor acts as a cable termination, and as an output port by otherwise allowing the serial digital video signal to pass through the cable driver to the cable connector.

2. The port as recited in claim 1 further comprising a D.C. blocking capacitor coupled in series with the impedance matching resistor.

3. The port as recited in claims 1 or 2 further comprising a decoupling capacitor coupled in series between the cable connector and the receiver.

4. A bi-directional serial video port comprising:

means for driving a cable via a cable connector with a serial digital video signal;

means coupled to the cable connector for receiving the serial digital video signal; and means for terminating a cable connected to the cable connector with a matching impedance when the port is configured as an input port.

5. The port as recited in claim 4 wherein the terminating means comprises:

an impedance matching resistor coupled in series between the driving means and the cable connector; and means for driving the output of the driving means low so that the impedance matching resistor is the matching impedance.

* * * * *